Patented May 18, 1954

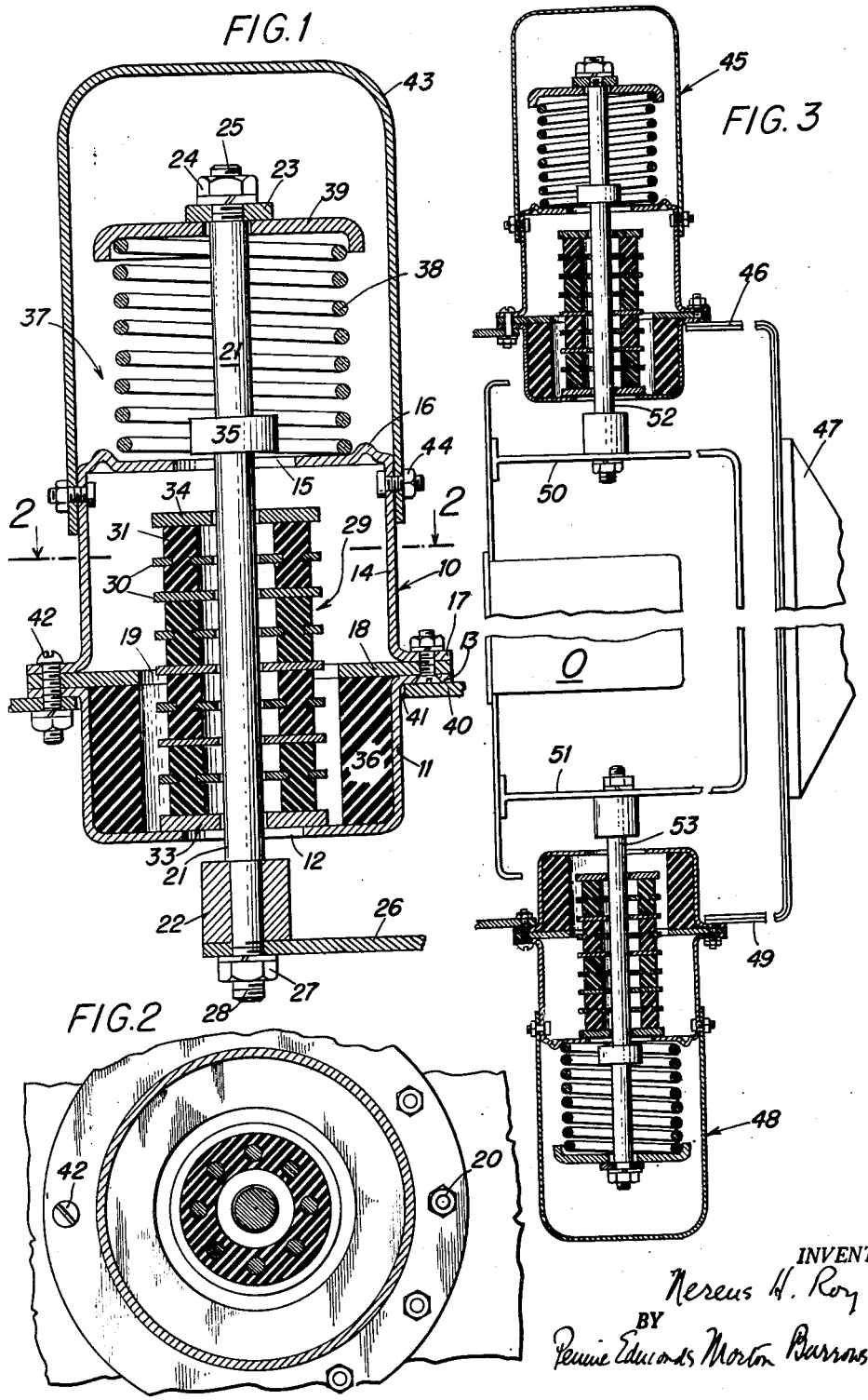

2,678,797

UNITED STATES PATENT OFFICE 2,678,797

VIBRATION AND SHOCK ISOLATOR

Nereus Hubert Roy, Glenbrook, Conn., assignor to Waugh Equipment Company, New York, N. Y., a corporation of Maine Original application April 30, 1952, Serial No. 285,113. Divided and this application May 14, 1953, Serial No. 355,049

3 Claims. (Cl. 248—358)

This invention relates to yielding mounts to be interposed between an object and a fixed support, such a mount carrying the weight of the object and isolating vibration and absorbing shock. More particularly, the invention is concerned with a novel mount especially suitable for supporting objects, which require unusually good protection against low amplitude vibration in one direction and heavy shocks in all directions, such objects frequently being of relatively light weight. The new mount may be advantageously employed in marine installations for supporting such objects as switchboards, instrument panels, etc., and forms of the new mount suitable for such application will, accordingly, be illustrated and described in detail for purposes of explanation.

On shipboard and especially on naval vessels, it is important that switchboard and similar structures be supported on mountings which are capable of isolating the structures from the vibration of the engines and protecting the structures against high intensity shocks resulting from explosions, direct hits, and near misses. In addition, the mountings should be of such construction that those parts of the mountings, which isolate vibration, are fully protected against damage by shock.

The present invention is directed to the provision of a mount, which meets the requirements stated and is of simple construction and easily installed, and functions for indefinite periods without requiring attention or adjustment. The new mount comprises a casing adapted to be secured rigidly to the support and a member extending longitudinally of the casing and projecting out of the casing through one end, the projecting end of the member being adapted to be rigidly secured to the object. The member is movable both endwise and laterally, and endwise movement of the member is resisted by vibration-isolating means engaging an abutment on the member and supported by a part of the casing. A shock-absorbing unit encircles the member within the casing intermediate other abutments on the member and acts, after an initial travel of the member against the resistance of the vibration-isolating means, to resist further movement of the member in that direction. The shock-absorbing unit is seated on the end of the casing, through which the member projects, and, when it is functioning, the vibration-isolating means is inoperative and no forces are transmitted through it. A second shock-absorbing unit within the casing resists lateral movement of the member and both units preferably include rubber as the resilient element, while the resilient element of the vibration-isolating means is preferably a metallic spring.

For a better understanding of the invention, reference may be made to the accompanying drawings, in which:

Fig. 1 is a vertical sectional view of the mount;
Fig. 2 is a sectional view on the line 2—2 of Fig. 1; and
Fig. 3 is a view partly in vertical section and partly in elevation of an installation, in which two of the mounts of the form shown in Fig. 1 are used to support an object.

The mount comprises a casing 10, which includes a lower cup 11 having a closed end with a central opening 12 and a peripheral flange 13 extending laterally at its open end. The casing also includes an upper cup 14 similar to cup 11, but somewhat longer and having a closed end with a central opening 15 and a bead 16 concentric therewith and a peripheral flange 17 extending laterally at its open end. The cups are of the same diameter, and they are assembled with their concavities facing each other and their flanges in alignment. A flat ring 18 of the same outer diameter as flanges 13 and 17 of the cups is disposed between the flanges and has a central opening 19 in alignment with the openings 12 and 15 in the ends of the cups. The assembly of the cups and the ring 18 is secured together by bolts 20 extending through aligned openings in the flanges on the cups and in the ring 18.

A member 21 of rod form extends through the central openings 12 and 15 in the cups and the central opening 19 in ring 18, and the lower end of the rod below the bottom of cup 11 is shouldered and encircled by an abutment in the form of a collar 22 engaging the shoulder and of less diameter than opening 12. At its upper end, the rod is also shouldered and encircled by a washer 23 of less diameter than opening 15 and held against the shoulder by a nut 24 threaded on the end 25 of the rod. The lower end of the rod is connected to the object to be supported by an arm 26 having an opening through which the rod extends, the arm being held against collar 22 by a nut 27 threaded on the lower end 28 of the rod.

The lower cup 11 supports a shock-absorbing unit 29, which encircles a lower part of the rod 21 and is made up of a plurality of rubber springs, each consisting of a flat metal plate 30 having rubber rings 31 applied to opposite faces thereof and connected together through openings through the plate. Adjacent rubber springs in the unit are separated by a flat metal divider plate 32 and the unit shown is made up of four rubber springs and three divider plates. The lower end of the unit engages the upper surface of a flat annular follower 33, which encircles rod 21 and rests on the inner side of the closed end of cup 11, and the unit extends upward through the ring 18. A flat follower 34 rests on top of unit 29 in position to engage a central abutment 35 fast on rod 21, the abutment being small enough to pass through the opening 15 in cup 14.

The lower cup contains a second shock-absorbing unit 36, which has the form of a rubber sleeve lying within the cup against the inner cylindrical surface thereof and extending from the bottom of the cup to the lower surface of ring 17. The sleeve has an inner diameter somewhat greater than the outer diameter of follower 33.

The mount includes vibration-isolating means 37, which comprises a coil spring 38 encircling the upper part of rod 21 and seated upon the outer surface of the closed end of cup 14 within the bead 16. The spring 38 extends upwardly beyond the central abutment 35 and its upper end engages a flanged follower 39 and holds the follower in contact with washer 23. The follower serves as an abutment on rod 21.

The mount may be installed by being attached to a rigid support 40. For this purpose, the lower cup 11 of the mount is inserted through an opening 41 through the support, and the mount is then secured to the support by the bolts 42, which pass through aligned openings in the support, the cup flanges 13 and 17, and the ring 18. Preferably, the vibration-isolating unit 37 is enclosed within a top cup 43, which telescopes over the upper end of cup 14 and is secured thereto by bolts 44.

In the normal operation of the mount, vibration of the support is isolated from the object by the alternate compression and expansion of the coil spring 38, and the mount is so constructed that the amplitude of the vibration, to which the object is normally subjected, is less than the distance between abutment 35 on rod 21 and the follower 34 at the top of the shock-absorbing unit 29. Also, the abutment 35 engages follower 34 before the spring 38 goes solid by reason of its convolutions engaging with one another. If the mount is subjected to a heavy shock tending to move the support upward relative to rod 21, the spring 38 is compressed against follower 39 and follower 34 then engages the central abutment 35 on the rod. The shock-absorbing unit 29 is then compressed between abutment 35 and the closed end of cup 11 and absorbs the shock. If the shock occurs in the reverse direction, follower 33 at the lower end of the shock-absorbing unit 29 engages collar 22 on the rod and the unit is held stationary with rod 21, until follower 34 is engaged by the top of the cup 14. Unit 29 is then compressed between abutment 22 and the top of cup 14 and acts to absorb the shock. Any horizontal component of shock resulting in relative lateral movement of rod 21 and the support causes follower 33 and part of shock-absorbing unit 29 to engage shock-absorbing unit 36 and the component is thus absorbed by compression of unit 36.

A typical installation employing two of the mounts illustrated in Figs. 1 and 2, is shown in Fig. 3, in which an upper mount 45 is attached to the upper part of the framework member 46 secured to the fixed support 47, and a lower mount 48 reversed in position is secured to the lower part 49 of the framework. The object O is secured to a frame having bars 50 and 51 connected to the rods 52 and 53 of the upper and lower mounts, respectively. Mount 45 functions in the manner described in connection with the mount shown in Figs. 1 and 2, while mount 48, which is upside down, functions in the reverse manner.

This application is a division of my co-pending application, Serial No. 285,113, filed April 30, 1952.

I claim:

1. A mount for isolating vibration and absorbing shock between an object and a support, which comprises a casing, means for rigidly attaching the casing to the support, a member extending longitudinally of the casing and projecting through the lower end of the casing, the member being movable endwise and laterally, means for securing the portion of the member which projects through the lower end of the casing rigidly to the object, an upper abutment on the member, vibration-isolating means encircling the member and seated upon the upper end of the casing, the vibration-isolating means acting through said upper abutment to resist endwise movement of the member out through said lower end of the casing, a shock-absorbing unit encircling the member within the casing, said shock absorbing unit normally having one end seated on the lower end of the casing, and laterally movable with the member, a second abutment on the member below the shock absorbing unit, a third abutment on the member between the upper end of the shock absorbing unit and the upper abutment, the second and third abutments being spaced apart a distance greater than the length of the shock absorbing unit, the second and third abutments being positioned to be engaged alternately with the shock absorbing unit upon relative movement of the unit and member in opposite directions, and a second shock-absorbing unit within the casing surrounding the first unit and the member and resisting lateral movement of the first unit and the member.

2. A mount for isolating vibration and absorbing shock between an object and a support, which comprises a casing, means for rigidly attaching the casing to the support, a member extending longitudinally of the casing and projecting through the lower end of the casing, the member being movable endwise and laterally, means for securing the portion of the member which projects through the lower end of the casing rigidly to the object, an upper abutment on the member, vibration-isolating means encircling the member and seated upon the upper end of the casing, the vibration-isolating means acting through said upper abutment to resist endwise movement of the member out through said lower end of the casing, a shock-absorbing unit encircling the member within the casing, said shock absorbing unit normally having one end seated on the lower end of the casing, and laterally movable therewith, the unit being normally seated on the lower end of the casing and extending nearly to the other end, a second abutment on the member below the shock absorbing unit, a third abutment on the member between the upper end of the shock absorbing unit and the upper abutment, the second and third abutments being spaced apart a distance greater than the length of the shock absorbing unit, the second and third abutments being positioned to be engaged alternately with opposite ends of the shock absorbing unit upon relative movement of the unit and member in opposite directions, the top of the casing forming a stop arresting movement of the unit with the member in one direction, and a second shock-absorbing unit within the casing surrounding the first unit and the member and resisting lateral movement of the first unit and the member.

3. A mount for isolating vibration and absorbing shock between an object and a support, which comprises a casing, means for rigidly attaching the casing to the support, a member extending longitudinally of the casing and projecting through the lower end of the casing, the member being movable endwise and laterally, means for securing the portion of the member which projects through the lower end of the casing rigidly to the object, an upper abutment on the member, a spring encircling the member and seated on the top of the casing, the spring acting through the upper abutment to resist endwise movement of the member out through the lower end of the casing, a shock-absorbing unit encircling the member within the casing and laterally movable therewith, the unit being normally seated on the lower end of the casing, a second abutment on the member below the shock absorbing unit, a third abutment on the member between the upper end of the shock absorbing unit and the upper abutment, the second and third abutments being spaced apart a distance greater than the length of the shock absorbing unit, the second and third abutments being positioned to be engaged alternately with the shock absorbing unit upon relative movement of the unit and member in opposite directions, said second and third abutments normally lying outside the casing, a second shock-absorbing unit within the casing surrounding the first unit and the member and resisting lateral movement of the first unit and the member, and an enclosure for the spring mounted upon the casing.

References Cited in the file of this patent

UNITED STATES PATENTS

| Number | Name | Date |
| --- | --- | --- |
| 2,058,185 | Simon | Oct. 20, 1936 |
| 2,397,804 | Nakken et al. | Apr. 2, 1946 |

FOREIGN PATENTS

| Number | Country | Date |
| --- | --- | --- |
| 483,703 | Great Britain | Apr. 19, 1938 |